(12) United States Patent
Condon et al.

(10) Patent No.: US 11,838,067 B2
(45) Date of Patent: Dec. 5, 2023

(54) SIGNAL INTERFERENCE PREDICTION SYSTEMS AND METHODS

(71) Applicant: DISH Network L.L.C., Englewood, CO (US)

(72) Inventors: Caroline Condon, Denver, CO (US); Micah Moore, Windsor, CO (US); Jeffrey Mailloux, Monument, CO (US); James Brunner, Parker, CO (US); Morgan Kirby, Palmer Lake, CO (US)

(73) Assignee: DISH Network L.L.C., Englewood, CO (US)

( * ) Notice: Subject to any disclaimer, the term of this patent is extended or adjusted under 35 U.S.C. 154(b) by 155 days.

(21) Appl. No.: 17/645,903

(22) Filed: Dec. 23, 2021

(65) Prior Publication Data

US 2023/0208539 A1  Jun. 29, 2023

(51) Int. Cl.
| | | |
|---|---|---|
| *H04B 17/373* | (2015.01) | |
| *H04B 7/185* | (2006.01) | |
| *G06T 7/73* | (2017.01) | |
| *H04B 17/391* | (2015.01) | |

(52) U.S. Cl.
CPC ............ *H04B 17/373* (2015.01); *G06T 7/74* (2017.01); *H04B 7/18513* (2013.01); *H04B 7/18519* (2013.01); *H04B 17/3913* (2015.01)

(58) Field of Classification Search
CPC .............. H04B 17/373; H04B 17/3913; H04B 7/18513; H04B 7/18519; G06T 7/74
See application file for complete search history.

(56) References Cited

U.S. PATENT DOCUMENTS

| | | | | |
|---|---|---|---|---|
| 2009/0190491 | A1* | 7/2009 | Miller | H04B 7/18513 |
| | | | | 370/252 |
| 2011/0159804 | A1* | 6/2011 | Petruzzelli | H04B 17/318 |
| | | | | 455/226.2 |
| 2015/0188644 | A1* | 7/2015 | Kang | H04B 7/2041 |
| | | | | 455/12.1 |
| 2018/0167648 | A1* | 6/2018 | Lee | H04N 21/84 |
| 2018/0213271 | A1* | 7/2018 | Shah | H04N 21/458 |
| 2018/0213280 | A1* | 7/2018 | Shah | H04N 21/436 |
| 2019/0115975 | A1* | 4/2019 | Freedman | H01Q 15/16 |
| 2021/0011684 | A1* | 1/2021 | Trim | G06F 9/451 |
| 2022/0116105 | A1* | 4/2022 | Robinson | H04B 7/18517 |
| 2023/0071265 | A1* | 3/2023 | Bereciartua-Perez | |
| | | | | G06V 10/454 |

OTHER PUBLICATIONS

Amaya et al., "Characteristics of Rain Fading on Ka-Band Satellite-Earth links in a Pacific Maritime Climate", SBMO/IEEE MTT-S International and Microwave Conference (Year: 1999).*

* cited by examiner

*Primary Examiner* — Raymond S Dean
(74) *Attorney, Agent, or Firm* — KW Law, LLP (57) ABSTRACT

Systems, devices and processes are described herein to improve the reliable delivery of content in a satellite system by facilitating the prediction of likely future signal interference. Specifically, the various embodiments provide a technique whereby a likelihood of future plant growth interfering with received signal strength at a satellite dish is determined. In one embodiment, the technique analyses one or more images of a plant in the vicinity of the satellite dish and from that image generates prediction of future growth of the plant over a future time period. From this prediction of future plant growth, a likelihood of future signal interference being caused by the plant can be determined.

20 Claims, 7 Drawing Sheets

SIGNAL INTERFERENCE PREDICTION SYSTEMS AND METHODS

TECHNICAL FIELD

The following discussion generally relates to satellite and other line-of-sight communication systems. More particularly, the following discussion relates to predicting future signal interference for satellite and other line-of-sight communication systems.

BACKGROUND

Media content, including radio, video-on-demand (VOD) and television (TV) programming, has traditionally been delivered to viewers over satellite and other broadcast systems. In such systems the media content is transmitted from an orbiting satellite to an antenna typically referred to as a satellite dish. Because of the nature of satellite transmission a clear line of sight between satellite and satellite dish is typically needed for strong signal reception at the satellite dish. Any objects in the line-of-sight can reduce the received signal strength and unacceptably interfere with the reception of the media content.

Unfortunately, in some satellite dish installations and other line-of-sight communication systems environmental changes can lead to future problems. Thus, there is continuing need to provide systems and methods that can predict problems with satellite signal reception. Other desirable features and characteristics will become apparent from the subsequent detailed description and the appended claims, taken in conjunction with the accompanying drawings and this background section.

BRIEF SUMMARY

The various embodiments described herein provide systems, devices and/or processes to improve the delivery of content in a satellite or other line-of-sight communication system by facilitating the prediction of likely future signal interference. Specifically, the various embodiments provide a technique whereby a likelihood of future plant growth interfering with received signal strength at a satellite dish or other type of antenna is determined. In one embodiment, the technique analyses one or more images of a plant in the vicinity of the satellite dish or other antenna and from that image generates prediction of future growth of the plant over a future time period. From this prediction of future plant growth, a likelihood of future signal interference being caused by the plant can be determined.

In one embodiment, an automated process executable by a computing system that includes a processor and a memory coupled to the processor is provided, the automated process comprising: providing an image of a first plant in a vicinity of an installation site for a satellite dish; analyzing the image of the first plant to identify a type of the first plant; generating a prediction of future growth of the first plant for a first time period; and determining a first likelihood of the predicted future growth of the first plant interfering with signal strength received at the satellite dish within the first time period.

A further example may be implemented comprising generating an alert if the determined first likelihood of predicted future growth of the first plant interfering with signal strength received at the satellite dish is beyond a first threshold.

A further example may be implemented wherein the computing system includes a mobile phone that includes a camera, and wherein the providing the image of the first plant comprises generating the image with the camera.

A further example may be implemented that further comprises providing a distance between the first plant and the satellite dish and providing a current first dimension of the plant.

A further example may be implemented that further comprises providing an offset distance between the first plant and a line-of-sight path between the satellite dish and a satellite and a further example may be implemented that further comprises providing the offset distance between the first plant and a line-of-sight path between the satellite dish and the satellite comprises estimating the offset distance using an image.

A further example may be implemented wherein the analyzing the image of the first plant to identify the type of the first plant comprises identifying a genus and a species of the first plant.

A further example may be implemented that further wherein the analyzing the image of the first plant to identify the type of the first plant comprises comparing the image to a database of plant images.

A further example may be implemented that further wherein the generating the prediction of future growth of the first plant for the first time period comprises utilizing a database of plant types and location data for the first plant to generate the prediction of future growth of the first plant.

A further example may be implemented wherein the generating the prediction of future growth of the first plant for the first time period comprises utilizing a current date to predict season-related growth of the first plant.

A further example may be implemented wherein the determining the first likelihood of the predicted future growth of the first plant interfering with signal strength received at the satellite dish within the first time period comparing the predicted future growth of the first plant to an offset distance between the first plant and a line-of-sight path between the satellite dish and a satellite.

A further example may be implemented that further comprises generating a prediction of future growth of the first plant for a second time period and determining a second likelihood of predicted future growth of the first plant interfering with signal strength received at the satellite dish within a second time period.

A further example may be implemented that further comprises generating a visual representation of the prediction of future growth of the first plant. This visual representation of the prediction of future growth of the first plant can overlaid an image of the first plant.

In another embodiment automated process executable by a computing system that includes mobile computing device with a camera, a processor and a memory coupled to the processor is provided, the automated process comprising: generating an image of a first plant in a vicinity of an installation site for a satellite dish using the camera; comparing the image of the first plant to a database of plant images to identify a species of the first plant; providing a current first dimension of the first plant; providing an offset distance of the first plant from a line-of-sight path between a satellite and the satellite dish; generating a prediction of future growth of the first plant in a first direction for a first time period based at least in part of the identified species of the first plant and location data for the first plant and the current first dimension of the first plant; determining a first likelihood of the first plant interfering with signal strength received at the satellite dish within the first time period based at least in part of the prediction of future growth of the first plant and an offset distance of the first plant from the line-of-sight path between the satellite and the satellite dish; and generating an alert if the determined first likelihood of predicted future growth of the first plant interfering with signal strength received at the satellite dish is beyond a first threshold.

In another embodiment, an automated process executable by a mobile computing device and a server system is provided, the automated process comprising: generating an image of a first plant in a vicinity of an installation site for a satellite dish using a camera on the mobile computing device; transmitting the image of the first plant to the server system; providing location data of the installation site to the server system; at the server system analyzing the image of the first plant at the server system and the location data to identify a type of the first plant; at the server system generating a prediction of future growth of the first plant for a first time period; at the server system determining a first likelihood of the predicted future growth of the first plant interfering with signal strength received at the satellite dish within the first time period; and at the mobile computing device providing an alert if the determined first likelihood of predicted future growth of the first plant interfering with signal strength received at the satellite dish is beyond a first threshold.

A further example may be implemented further comprising providing a current first dimension of the plant and providing an offset distance between the first plant and a line-of-sight path between the satellite dish and a satellite.

A further example may be implemented wherein the providing a current first dimension of the plant and providing the offset distance between the first plant and a line-of-sight path between the satellite dish comprises using a LIDAR on the mobile computing system to generate the current first dimension and the offset distance.

A further example may be implemented that further comprises providing a current first dimension of the plant comprises prompting a user to enter an estimate of the current first dimension at the mobile computing device.

A further example may be implemented wherein the analyzing the image of the first plant to identify the type of the first plant comprises comparing the image to a database of plant images.

A further example may be implemented wherein the generating the prediction of future growth of the first plant for the first time period comprises utilizing a database of plant types at the server system to generate the prediction of future growth of the first plant.

A further example may be implemented wherein the determining the first likelihood of the predicted future growth of the first plant interfering with signal strength received at the satellite dish within the first time period comparing the predicted future growth of the first plant to an offset distance between the first plant and a line-of-sight path between the satellite dish and a satellite.

Various additional examples, aspects and other features are described in more detail below.

BRIEF DESCRIPTION OF THE DRAWING FIGURES

Exemplary embodiments will hereinafter be described in conjunction with the following drawing figures, wherein like numerals denote like elements, and.

DETAILED DESCRIPTION

The following detailed description of the invention is intended to provide various examples, but it is not intended to limit the invention or the application and uses of the invention. Furthermore, there is no intention to be bound by any theory presented in the preceding background or the following detailed description.

The various embodiments described herein provide systems, devices and/or processes to improve the delivery of content in a satellite and other communication systems by facilitating the prediction of likely future signal interference. Specifically, the various embodiments provide a technique whereby a likelihood of future plant growth interfering with received signal strength at a satellite dish or other antenna is determined. In one embodiment, the technique analyses one or more images of a plant in the vicinity of the satellite dish or other antenna and from that image generates a prediction of future growth of the plant over a future time period. From this prediction of future plant growth, a likelihood of future signal interference being caused by the plant can be determined.

In one embodiment these techniques are implemented using a mobile computing device, such as a smartphone or tablet. The use of a mobile computing device allows a satellite installer or other user to take photos of the area around the installation site. Selected photos can then the analyzed to identify the type of plant. For example, the photos can be analyzed to identify the genus and/or species of the plant. As one example, a pattern recognition algorithm can be used identify the genus and species of the plant from leaf patterns on the plant.

With the plant identified, a prediction of future plant growth can be generated. In one embodiment a database or plant types and geolocation data is used to generate predictions of plant growth. Additionally, the date of the photographs can be used to predict seasonal-related plant growth.

With the future plant growth predicted, a determination of the likelihood of future signal interference can be determined. For example, by estimating the current and future dimensions of plant, and by determining one or more offset distances between the plant and a line of sight between the satellite dish and the satellite.

Figure 1A:
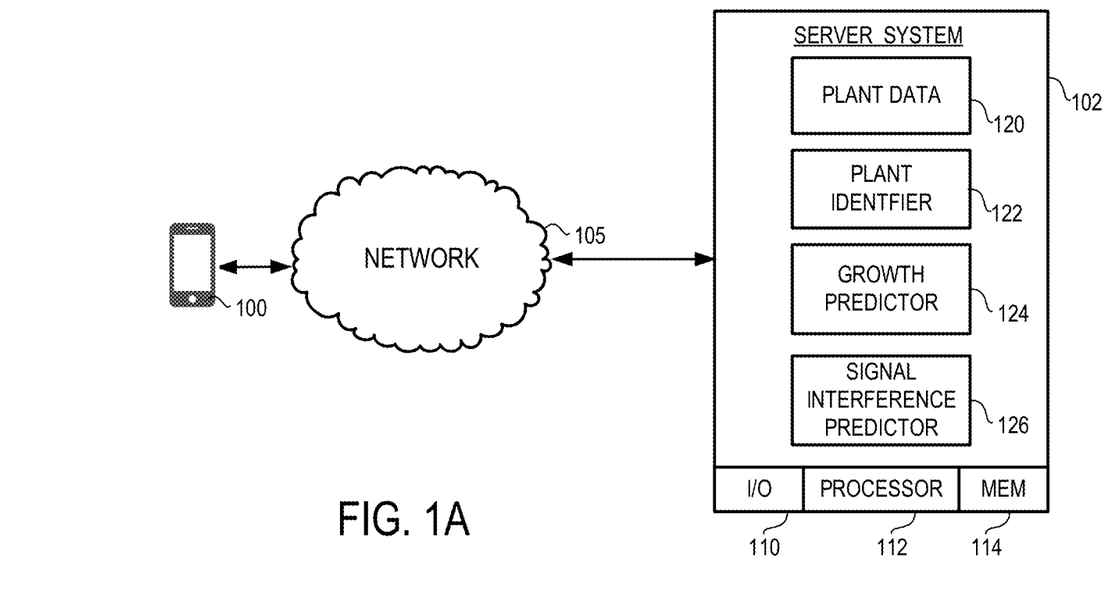
FIG. 1A is a schematic diagram of a signal interference prediction system in accordance with various embodiments.

Turning now to the drawings and with initial reference to FIG. 1A, a mobile computing device 100 and a server system 102 are illustrated. The computing device 100 is coupled to the server system 102 through a network 105. In this illustrated example, the mobile computing device 100 is a smartphone or tablet computer, but other mobile computing devices can be used. The mobile computing device 100 will include a suitable memory and processor capable of performing automated processes. And in most embodiments, the mobile computing device 100 will include a camera that can be used to generate photos. And finally, in some embodiments the mobile computing device will include other sensors, such as LiDAR sensors that can be used to compute distances, and GPS devices that are used to determine location.

And in some embodiments, the mobile computing device 100 can include a user interface designed to receive additional relevant data directly from a user. For example, the mobile computing device 100 can prompt the user to enter relevant data such as the current distance between the plant and the satellite dish and/or the distance between the plant and a line-of-sight path between the dish and satellite.

The network 105 can include any suitable networks, including wired and wireless networks that facilitate communication with the server system 102 over the Internet. To facilitate this mobile computing device 100 can include wireless communication devices, including broadband cellular devices (e.g., 4G and 5G), Wi-Fi devices, or any other suitable network facilitating device.

The server system 102 includes a suitable input/output device 110, processor 112, and memory 114. As such, the server system 102 can perform automated processes in conjunction with the mobile computing device 100. And it should be noted that while the server system 102 is illustrated as one device, that it could instead be implemented over plurality of devices that each can include their own I/O devices, processors and/or memory systems.

In the illustrated example, the server system 102 includes plant data 120, plant identifier 122, growth predictor 124 and signal interference predictor 126. Each of these elements can be implemented with a suitable combination of hardware and/or software on the server system 102. For example, with datasets that correspond to the plant data 120 and software modules that correspond to the plant identifier 122, growth predictor 124 and signal interference predictor 126. Additionally, each of these elements can be implemented on or to work with corresponding hardware and/or software on the mobile computing device 100.

As described above, the mobile computing device 100 and server system 102 are configured to improve the delivery of content in a satellite system by determining a likelihood of future plant growth interfering with received signal strength at a satellite dish. To facilitate this the plant data 120 can be implemented as a database of plant-related data indexed by plant type (e.g., by species and/or genus). This plant data 120 can include any data used to identify the type of plant (e.g., leaf information, flower information, location information, etc.) Additionally, this plant data 120 can include information regarding likely future growth of the plants (e.g., average growth rates, seasonal growth patterns, whether the plant is evergreen or deciduous, etc.). It should be noted that information regarding growth rates can be location dependent (e.g., dependent upon latitude, altitude, etc.) and local climate dependent (e.g., dependent upon local temperature patterns, rainfall patterns, humidity patterns, etc.). Furthermore, this likely future growth can be described in multiple dimensions, such as growth in height, width, area, etc. Thus, as a detailed example the plant data 120 can describe the average yearly growth various plants in a variety of locations and climates.

In general, the plant identifier 122 operates to identify plants using images received from the mobile computing device 100 and the plant data 120. As one example, a user of the system would take one or more photos of a plant in the vicinity of satellite dish installation site. The photos (and/or data extracted from the photos) can then transmitted to the server system 102. Additionally, related data (e.g., location data identifying the location where the photograph was taken) can also be transmitted from the mobile computing device 100 to the server system 102. The transmitted photos and any other associated data can then analyzed by the plant identifier 122 to identify the type of plant pictured in the photos.

In general, any suitable technique for analyzing the photos and identifying the plants can be used by the plant identifier 122. As one example, a pattern recognition technique can be used images of the leaves, branches, flowers, or other parts of the photographed plant to identify the type of plant. Examples of pattern recognition techniques include techniques based on machine learning, where the system is trained to recognize plants using sets of training data. As one detailed example, a neural network can be created and trained to identify plants from photographs and location data. Of course, this is just one non-limiting example of the type of system that can be used in the plant identifier 122. Finally, it should be noted that all or part of the processing for the plant identifier 122 can be performed on the mobile computing device 100.

In general, the growth predictor 124 operates the predict the growth of the identified plants based on the current size of the plant and the plant data 120. For example, the growth predictor can receive information from the mobile computing device 100 regarding one or more current dimensions of the plant. In some embodiments, a user can be asked to enter an estimate of the height, area, canopy size and/or other dimensions of the plant. In other embodiments the growth predictor 124 can generate an estimate of the current size of the plant from the images of the plant.

As described above, the plant data 120 can include growth rate information, including average growth rates and seasonal growth patterns. Furthermore, this growth rate information can include location dependent data (e.g., growth rates at various latitudes, altitudes, climates). Thus, as a detailed example the plant data 120 can describe the average yearly growth various plants in a variety of locations and climates.

With an estimate of the current size of the plant and the growth rate information provided in the plant data 120, the growth predictor 124 can generate a prediction of the likely growth of the plant over one or more future time periods. For example, the growth predictor 124 could generate an estimate in the change in height and width that is likely to occur each year over the next ten years. In other embodiments, the growth predictor 124 could generate a mathematical description of the likely shape (e.g., profile shape, canopy shape) of the plant of plant in five years. In some embodiments these estimates can comprise a range of values with associated probabilities for each value or range of values.

In other embodiments these estimates can take into account the current growing season and seasonal growth patterns of the plant. In such an embodiment the current date can be used in generating a prediction of season-related growth. For example, if the plant is identified to be a deciduous plant and it is currently winter such that the plant is without leaves, the system can estimate future growth by accounting for the addition of leaves that will likely grow on the plant in the spring. Thus, the system can account for a plant that does not currently have a dense canopy of leaves but may have leaves when the seasons change.

In general, the signal interference predictor 126 operates to generate a determination of the likelihood of future signal interference. For example, by using the estimates of future plant growth, the distance between the plant and the satellite dish (or other antenna), and the position of the plant relative to a line-of-sight path between the dish and the satellite (or between other line-of-sight antennas), the likelihood of future signal interference can be estimated. Specifically, the signal interference predictor 126 can generate a likelihood that the plant will grow such that it will block all or part of the line-of-sight path between the satellite dish and the satellite.

In another embodiment the mobile computing device 100 and server system 102 can be implemented to provide one or more graphical representations of plant growth predictions and/or signal interference predictions. For example, graphical representations of how a plant is predicted to grow over time can be generated at the server system 102 and transmitted to the mobile computing device 100, where these graphical representations can then be displayed or otherwise presented to the user.

In some embodiments, these graphical representations can include relatively simple shapes that provide an intuitive visual representation of predicted growth. In one specific embodiment these shapes can be overlaid a current image of the plant to provide an easy to understand illustration of likely future plant growth to the user. Furthermore, in some embodiments visual representations of the areas of potential interference with the line-of-sight path can be highlighted on the modified images. Again, such images can be generated at the server system 102 and transmitted to the mobile computing device 100, or could instead be generated at the mobile computing device 100.

In some embodiments a true-to-life visual image can be computer-generated to represent the predicted plant growth. In such an embodiment, augmented reality (AR) techniques can be used to generate a true-to-life visual image of the plant at the larger size it is predicted to attain at some future time period. Again, such images can be overlaid or otherwise combined with an original image of the plant to illustrate the projected plant growth to the user. In further embodiments multiple images representing plant growth over time can be generated and overlaid an image of the plant to provide an animated representation of plant growth over multiple time periods. In other yet embodiments a computer generated 3D model representing the plant growth over time can be provided to the user. In each of these cases the computer-generated representations of likely future plant growth can be based on the amount of growth predicted by the growth predictor 124.

Furthermore, in some embodiments visual representations of the areas of potential interference with the line-of-sight path can be highlighted or otherwise displayed on the modified images. For example, a visual representation of the line-of-sight signal path between the satellite and the satellite dish installation site can also be overlaid a generated image of future plant growth. Such an embodiment can inform the user exactly how the future growth of the plant is likely to interfere with the direct line of sight path between satellite and satellite dish. Again, such images can be generated at the server system 102 and transmitted to the mobile computing device 100, or could instead be generated at the mobile computing device 100.

Figure 1B:
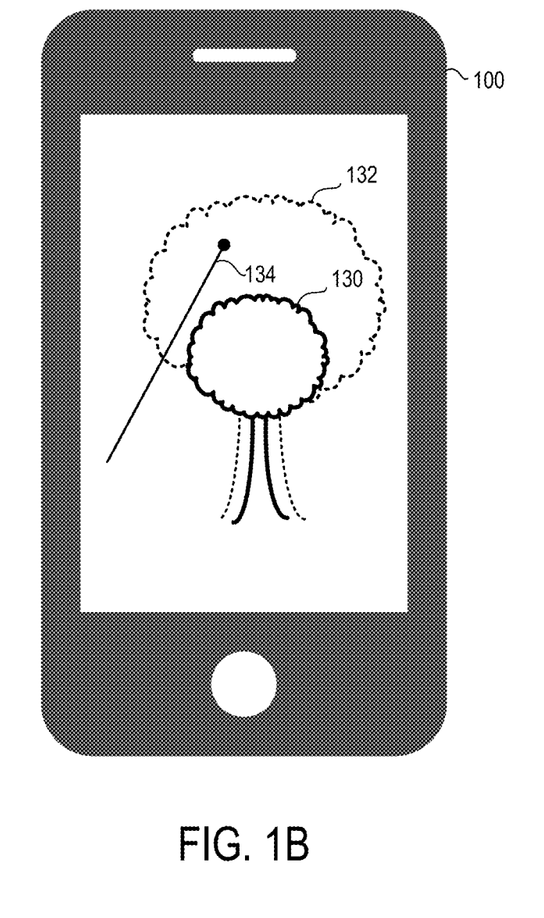
FIG. 1B is a schematic diagram of a mobile computing device in accordance with various embodiments.

Turning now to FIG. 1B, an expanded view of the mobile computing device 100 is illustrated. In FIG. 1B the mobile computing device is displaying both an image 130 of a tree and a computer-generated image 132 showing predicted future growth of the tree. Specifically the image 130 that shows the current state of a tree is overlaid the computer-generated image 132 that shows the predicated growth of the tree after a future time period. Also displayed is a line 134 that provides a visual representation of the line-of-sight signal path between the satellite and the satellite dish installation site. As can be seen in FIG. 113, the displayed line 134 allows a user to see exactly where the future growth of the tree is likely to interfere with the direct line of sight path between satellite and satellite dish. With this information the user can select a better installation site or make changes to the installation as needed.

Figure 2:
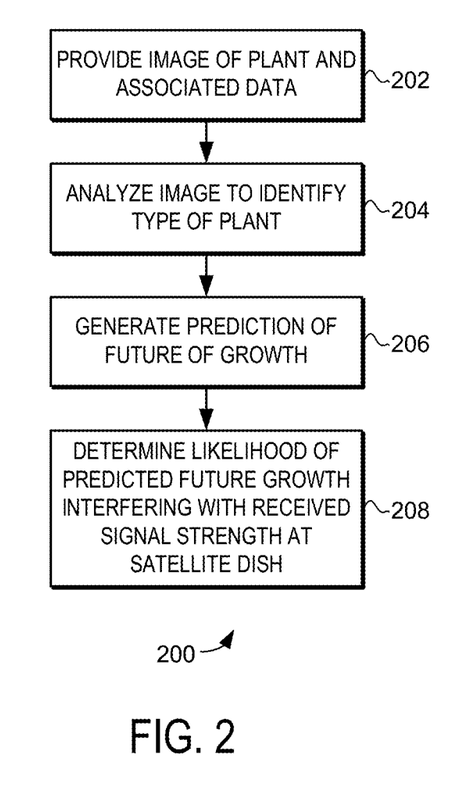
FIG. 2 is a flowchart illustrating a method of signal interference prediction in accordance with various embodiments.

Turning now to FIG. 2, a method 200 for determining a likelihood of future signal interference at a satellite dish is illustrated. The method 200 is an example of a method that can be implemented as an automated process executed by processor residing in memory. For example, the automated process can be executed by a mobile computing device (e.g., mobile computing device 100) and/or a server system (e.g., server system 102). In general, the method 200 is implemented to improve the future reliability of a satellite system by determining a likelihood of future plant growth interfering with received signal strength at a satellite dish.

For example, if there is determined to be a relatively high likelihood of future signal interference then an installer can be prompted to consider different installation sites for the satellite dish. Or the customer can be warned of possibility of future problems so that corrective actions can be taken. Or the installation can be flagged so that in future service calls the technician is aware of the possible problem due to signal interference and can have the possible signal interference checked as an initial matter.

The first step 202 is to provide one or more images of a plant and associated data. As described above, in one embodiment the mobile computing device can include a camera that may be used by a satellite dish technician or other user to generate the image of a plant in the vicinity of a satellite dish installation. The image can be transmitted to the server system via the internet or other network. In other embodiments different devices can be used to generate the image(s).

A variety of associated data can also be provided. For example, data regarding the current size of the plant (e.g., height, width, canopy area) and the position of the satellite dish relative to the plant can be provided. As another example, data regarding the current distance between the plant and a line-of-sight path between satellite and satellite dish can be provided to the server system. Additionally, data describing the relative position of the satellite in the sky, the satellite, and the plant can be provided.

In one example embodiment the technician or other user is prompted to measure the relevant dimensions and distances as needed, measure relevant angles as needed, take photos as needed, and then that information can be provided to the system for identification and likelihood prediction. And in some embodiments the technician or other user may be prompted to identify the plants if the type of plant is already known.

Figure 3A:
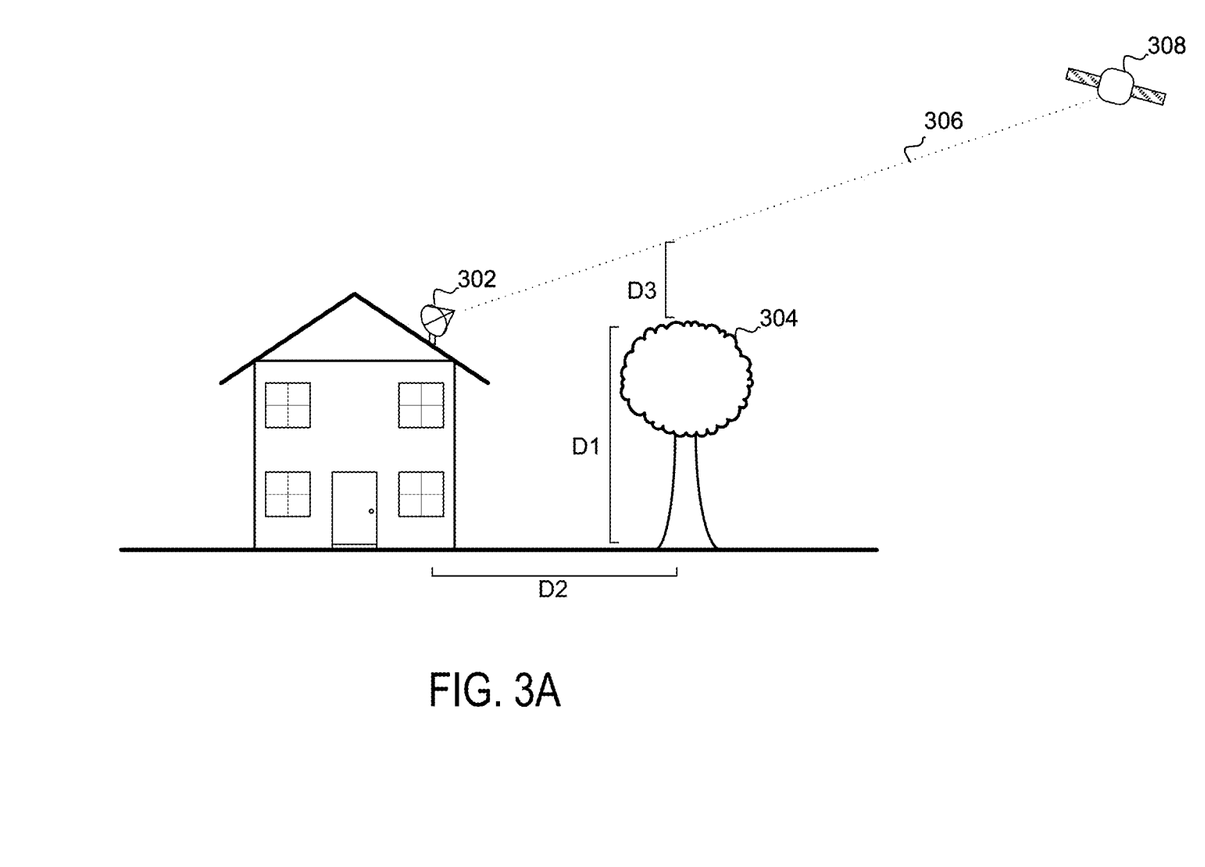
FIGS. 3A, 3B, 4A and 4B are schematic diagrams of exemplary satellite dish installations.

Turning briefly to FIG. 3A, an illustrated example installation of a satellite dish 302 is shown. In this simplified example, a tree 304 has a height of D1 and is growing at a distance D2 away from the satellite dish 302. Furthermore, there is currently an offset distance of D3 between the top of the tree 304 and the line-of-sight path 306 between the satellite dish 302 and a geostationary orbiting satellite 308. Thus, in this example the distances D1, D2 and/or D3 can be entered by a user or otherwise generated and provided to the system in step 202 along with one or more images of the tree 304 and installation site.

It should be noted that in some cases not all the distances would need to be provided by the user. For example, in some implementations the offset distance D3 between the top of the tree and the line-of-sight path 306 can instead be estimated by the system based on D1 and D2. And in some implementations other distances could instead be provided. For example, the distance between the center of the tree and the line-of-sight path 306 and an estimate on the size of the tree 304 may be provided instead of D3.

In some examples these various distances can be determined automatically by the system. For example, in some embodiments the mobile computing device can include a LIDAR that measures distances using the time-of-flight of reflected signals. Such a system can generate accurate distances from various locations around installation. And in some embodiments a LIDAR or such system can be used to generate a 3D surface map of the tree 304 and its vicinity from the perspective of the satellite dish 302 installation site. In other cases, image analysis techniques can estimate the relevant distances from one or more 2D images.

Figure 4A:
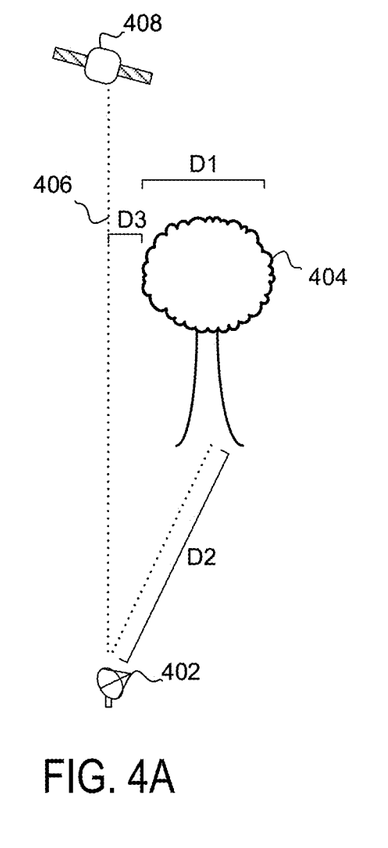

Turning briefly to FIG. 4A, a second illustrated example installation of a satellite dish 402 is shown. In this second simplified example, a tree 404 has a canopy width of D1 and is growing at a distance D2 away from the satellite dish 302. Furthermore, there is currently an offset distance of D3 between the side of the tree 304 and the line-of-sight path 406 between the satellite dish 402 and a geostationary orbiting satellite 408. Thus, in this example the distances D1, D2 and D3 can be entered by a user and provided to the server system in step 202 along with an image of the tree 404.

Again, these various distances could be measured and manually entered by a user, or could instead be generated by the system using LIDAR or other tools on the mobile computing device.

Returning to FIG. 2, the next step 204 is to analyze the image to identify the type of plant. For example, the images provided in step 202 can be analyzed to identify the genus and/or species of the plant. As one example, step 204 can be implemented using a suitable pattern recognition technique that identifies the genus and/or species of the plant based on the leaves, branches, flowers, or other parts of the photographed plant. Again, examples of pattern recognition techniques include techniques based on machine learning, where the system is trained to recognize plants using appropriate sets of training data.

The next step 206 is to generate a prediction of future growth of the plant. In general, step 206 can be implemented to use data on the current size (e.g., height, width, canopy area) of the plant and growth rate data describing the growth rate of the identified type of plant. This growth rate data can include location dependent data (e.g., growth rates at various latitudes, altitudes, climates).

In step 206 a prediction of the likely growth of the plant over one or more future time periods can be generated. For example, the step 206 could generate an estimate in the change in height and/or width that is likely to occur each year over the next ten years. In other embodiments, the step could generate a mathematical description of the likely shape (e.g., profile shape, canopy shape) of the plant of plant in five years. In some embodiments these estimates can comprise a range of values with associated probabilities for each value or range of values.

In step 208 a likelihood of future plant growth interfering with received signal strength at the satellite dish is determined. For example, by using the estimates of future plant growth, the distance between the plant and the satellite dish, and the offset distance of the plant relative to a line-of-sight path between the dish and the satellite, the likelihood of future signal interference can be estimated. Specifically, in this step a likelihood that the plant will grow such that it will block all or part of the line-of-sight path between the satellite dish and the satellite is generated. In one specific embodiment the likelihood of future plant growth interfering with received signal strength at the satellite dish can be determined by comparing the predicted future growth of the first plant to an offset distance (e.g., offset distances D3 in FIGS. 3A and 4A) between the first plant and a line-of-sight path between the satellite dish and a satellite.

In some embodiments this likelihood can be in the form of a percentage likelihood over various time periods. In these embodiments the percentage likelihood can be compared to various threshold values that will prompt alerts and other actions. In some embodiments these likelihoods can be estimated for multiple future time periods. Thus, it can be determined if there is likely to be signal interference in a short term time period and/or longer term time periods. For example, a percentage likelihood can be generated for each of one year, five years and ten years in the future.

Figure 3B:
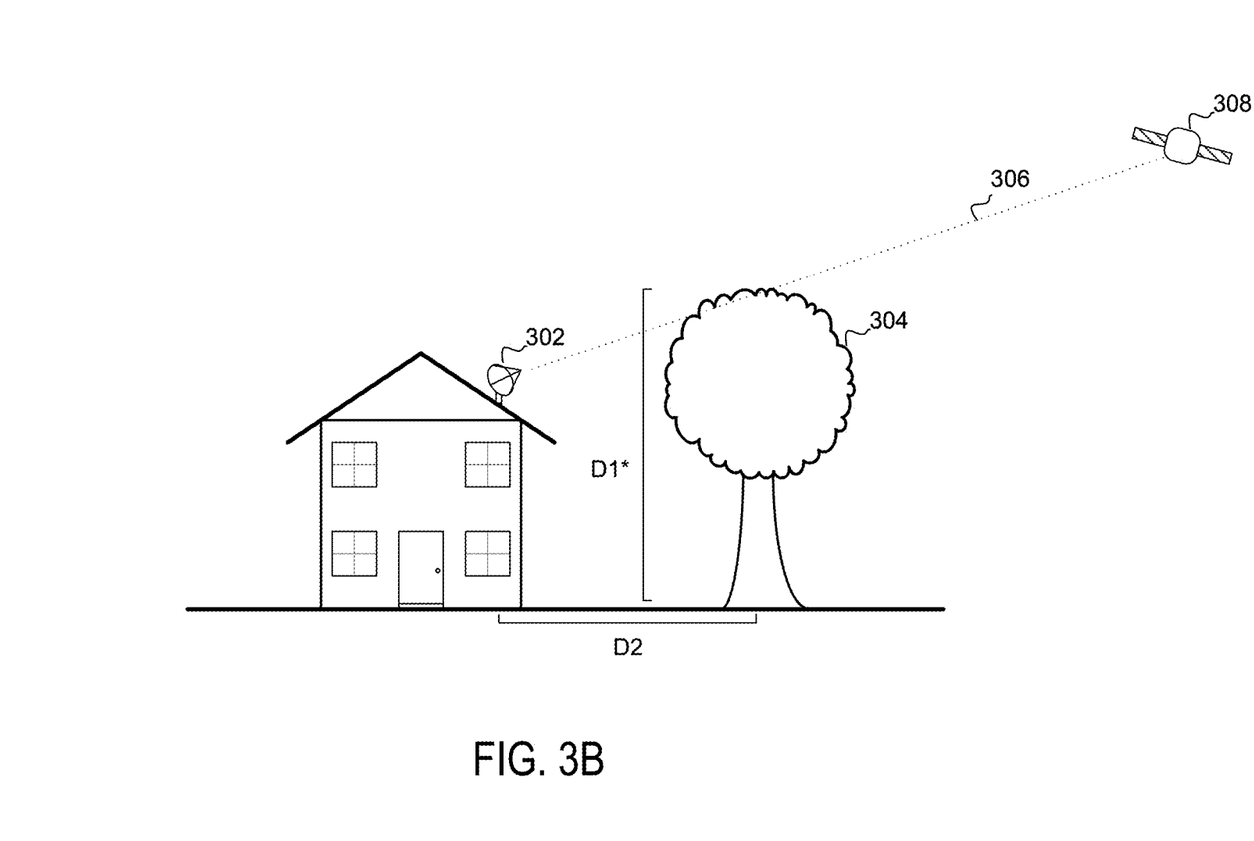

Turning now to FIG. 3B, the illustrated example installation of a satellite dish 302 is shown after the occurrence of estimated future growth to the tree 304. Specifically, in this illustrated example the tree 304 is estimated to increase in height to D1* within a specified period of years. In this simplified example, it can be determined there is a high likelihood of significant signal interference caused by the tree 304 when the tree is expected to grow to the new height of D1*

Figure 4B:
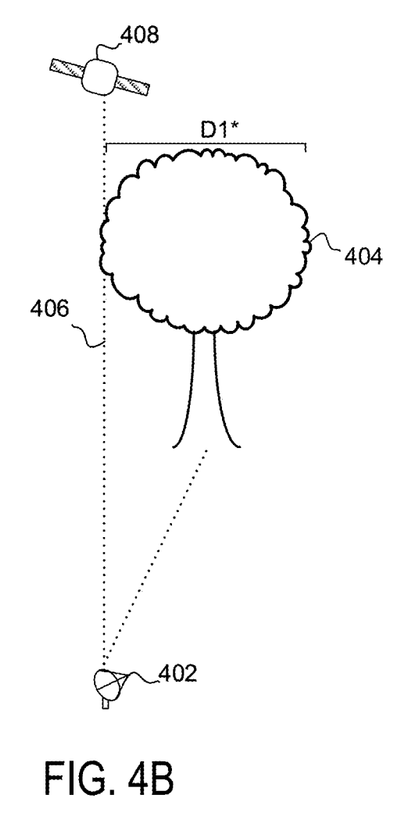

Turning now to FIG. 4B, the second illustrated example installation of a satellite dish 402 is shown after the occurrence of estimated future growth to the tree 404. Specifically, in this illustrated example the tree 304 is estimated to increase in canopy width to D1* within a specified period of years. In this simplified example, it can again be determined there is a high likelihood of significant signal interference caused by the tree 404 when the tree is expected to grow to have a new canopy width of D1*.

With a determination of a relatively high likelihood of future signal interference a variety of actions can then be taken. For example, an alert can be generated if a determined likelihood of predicted future growth of the first plant interfering with signal strength received at the satellite dish is beyond a threshold percentage. In this case the alert can be transmitted or generated at the mobile computing device to prompt the installer or other user to consider different installation sites for the satellite dish. In other embodiments the installation can be flagged so that in future service calls the technician is aware of the possible problem due to possible signal interference and can have signal interference from the plant checked as an initial matter in diagnosing problems. And in some cases, the customer can be provided with notifications of potential problems, including future notifications and reminders to trim the plants at issue.

In other embodiments one or more graphical representations of plant growth predictions and/or signal interference predictions can be generated and provided to the user. As described above, in some embodiments these graphical representations can include relatively simple shapes that provide an intuitive visual representation of predicted growth. In other embodiments true-to-life visual image can be computer-generated using various techniques to represent the predicted plant growth. Again, such images can be overlaid or otherwise combined with an original image of the plant to illustrate the projected plant growth to the user. In further embodiments multiple images representing plant growth over time can be generated and overlaid an image of the plant to provide an animated representation of plant growth over multiple time periods.

While these various systems and techniques have been described above mostly with regard to satellite communication systems and the installation of satellite dishes, it should be noted that they also apply to other communication systems. For example, the techniques are also applicable to the installation of other types of antennas for direct line-of-sight transmissions where plant growth can cause significant signal interference. As specific examples, the techniques described above can be applied to microwave radio antennas and other terrestrial communication antennas.

The various embodiments described herein thus provide systems, devices and/or processes to improve the delivery of content in a satellite system by facilitating the prediction of likely future signal interference in a satellite system. Specifically, the various embodiments provide a technique whereby a likelihood of future plant growth interfering with received signal strength at a satellite dish is determined. In one embodiment, the technique analyses one or more images of a plant in the vicinity of the satellite dish and from that image generates prediction of future growth of the plant over a future time period. From this prediction of future plant growth, a likelihood of future signal interference being by the plant can be determined.

The various concepts and examples described herein may be modified in any number of different ways to implement equivalent functions and structures in different settings. The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process executable by a computing system that includes a processor and a memory coupled to the processor, the automated process comprising:
   providing an image of a first plant in a vicinity of an installation site for a satellite dish;
   analyzing the image of the first plant to identify a type of the first plant;
   generating a prediction of future growth of the first plant for a first time period; and
   determining a first likelihood of the predicted future growth of the first plant interfering with signal strength received at the satellite dish within the first time period.

2. The automated process of claim 1 further comprising generating an alert if the determined first likelihood of predicted future growth of the first plant interfering with signal strength received at the satellite dish is beyond a first threshold.

3. The automated process of claim 1 wherein the computing system includes a mobile phone that includes a camera, and wherein the providing the image of the first plant comprises generating the image with the camera.

4. The automated process of claim 1 further comprising providing a distance between the first plant and the satellite dish and providing a current first dimension of the plant.

5. The automated process of claim 1 further comprising providing an offset distance between the first plant and a line-of-sight path between the satellite dish and a satellite.

6. The automated process of claim 5 wherein the providing the offset distance between the first plant and a line-of-sight path between the satellite dish and the satellite comprises estimating the offset distance using an image.

7. The automated process of claim 1 wherein the analyzing the image of the first plant to identify the type of the first plant comprises identifying a genus and a species of the first plant.

8. The automated process of claim 1 wherein the analyzing the image of the first plant to identify the type of the first plant comprises comparing the image to a database of plant images.

9. The automated process of claim 1 wherein the generating the prediction of future growth of the first plant for the first time period comprises utilizing a database of plant types and location data for the first plant to generate the prediction of future growth of the first plant.

10. The automated process of claim 1 wherein the generating the prediction of future growth of the first plant for the first time period comprises utilizing a current date to predict season-related growth of the first plant.

11. The automated process of claim 1 wherein the determining the first likelihood of the predicted future growth of the first plant interfering with signal strength received at the satellite dish within the first time period comparing the predicted future growth of the first plant to an offset distance between the first plant and a line-of-sight path between the satellite dish and a satellite.

12. The automated process of claim 1 further comprising:
   generating a prediction of future growth of the first plant for a second time period; and
   determining a second likelihood of predicted future growth of the first plant interfering with signal strength received at the satellite dish within a second time period.

13. The automated process of claim 1 further comprising generating a visual representation of the prediction of future growth of the first plant.

14. The automated process of claim 13 wherein the visual representation of the prediction of future growth of the first plant is overlaid an image of the first plant.

15. An automated process executable by a computing system that includes mobile computing device with a camera, a processor and a memory coupled to the processor, the automated process comprising:
   generating an image of a first plant in a vicinity of an installation site for a satellite dish using the camera;
   comparing the image of the first plant to a database of plant images to identify a species of the first plant;
   providing a current first dimension of the first plant;
   providing an offset distance of the first plant from a line-of-sight path between a satellite and the satellite dish;
   generating a prediction of future growth of the first plant in a first direction for a first time period based at least in part of the identified species of the first plant and location data for the first plant and the current first dimension of the first plant;
   determining a first likelihood of the first plant interfering with signal strength received at the satellite dish within the first time period based at least in part of the prediction of future growth of the first plant and an offset distance of the first plant from the line-of-sight path between the satellite and the satellite dish; and generating an alert if the determined first likelihood of predicted future growth of the first plant interfering with signal strength received at the satellite dish is beyond a first threshold.

16. An automated process executable by a mobile computing device and a server system, the automated process comprising:
  generating an image of a first plant in a vicinity of an installation site for a satellite dish using a camera on the mobile computing device;
  transmitting the image of the first plant to the server system;
  providing location data of the installation site to the server system;
  at the server system analyzing the image of the first plant at the server system and the location data to identify a type of the first plant;
  at the server system generating a prediction of future growth of the first plant for a first time period;
  at the server system determining a first likelihood of the predicted future growth of the first plant interfering with signal strength received at the satellite dish within the first time period; and
  at the mobile computing device providing an alert if the determined first likelihood of predicted future growth of the first plant interfering with signal strength received at the satellite dish is beyond a first threshold.

17. The automated process of claim 16 further comprising providing a current first dimension of the plant and providing an offset distance between the first plant and a line-of-sight path between the satellite dish and a satellite.

18. The automated process of claim 17 wherein the providing a current first dimension of the plant and providing the offset distance between the first plant and a line-of-sight path between the satellite dish comprises using a LIDAR on the mobile computing system to generate the current first dimension and the offset distance.

19. The automated process of claim 15 wherein the providing a current first dimension of the plant comprises prompting a user to enter an estimate of the current first dimension at the mobile computing device.

20. The automated process of claim 14 wherein the determining the first likelihood of the predicted future growth of the first plant interfering with signal strength received at the satellite dish within the first time period comparing the predicted future growth of the first plant to an offset distance between the first plant and a line-of-sight path between the satellite dish and a satellite.

* * * * *